United States Patent Office 3,647,894
Patented Mar. 7, 1972

3,647,894
RECOVERY OF 1,2,4,5-TETRACHLOROBENZENE
AND HEAT TRANSFER AGENTS
Larry L. Jackson and William D. Watson, Midland, Mich., assignors to The Dow Chemical Company, Midland, Mich.
No Drawing. Filed Feb. 9, 1970, Ser. No. 9,974
Int. Cl. C07c 25/04
U.S. Cl. 260—650 R          5 Claims

ABSTRACT OF THE DISCLOSURE

From a crude mixture of the isomers of tetrachlorobenzene, 1,2,4,5-tetrachlorobenzene may be isolated by dissolving the crude mixture in a halogenated diphenyl ether and fractionally crystallizing the 1,2,4,5-tetrachlorobenzene from solution. The mother liquor after crystallization is also useful as a fire resistant heat transfer agent having high flash and fire points.

BACKGROUND OF THE INVENTION

In the direct chlorination of benzene, two isomers of tetrachlorobenzene are formed as major products: 1,2,4,5-tetrachlorobenzene and 1,2,3,4-tetrachlorobenzene. Of these two isomers, the 1,2,4,5-tetrachlorobenzene is of primary importance because it can be hydrolyzed to form the valuable 2,4,5-trichlorophenol. The 1,2,3,4-isomer has no significant commercial value.

The economical separation of minor amounts of the 1,2,4,5-isomer from the 1,2,3,4-isomer has been extremely difficult. Such concentrations are usually found in the separation by distillation of the two isomers where the 1,2,3,4-tetrachlorobenzene fraction normally contains about 10 to 20% of the desired 1,2,4,5-isomer. Since no commercially feasible method is known for separating the 1,2,4,5-tetrachlorobenzene isomer from the crude mixture with the 1,2,3,4-isomer, 10 to 20% of the essentially useless tetrachlorobenzene disposed of is the valuable 1,2,4,5-isomer. As a result of this waste, there has been an intensive search for a suitable method of recovering the 1,2,4,5-tetrachlorobenzene from the crude mixture by a technique which gives a valuable by-product.

SUMMARY OF THE INVENTION

According to the present invention, the 1,2,4,5-tetrachlorobenzene may be recovered from its crude mixture with 1,2,3,4-tetrachlorobenzene by dissolving the crude mixture in a halogenated diphenyl ether and fractionally crystallizing the 1,2,4,5-tetrachlorobenzene. By this method, substantially all of the 1,2,4,5-isomer may be separated from the crude mixture of tetrachlorobenzene and the waste attendant to the disposal of the 1,2,3,4-tetrachlorobenzene may be avoided. Moreover, the resultant mother liquor from crystallization is an effective fire resistant heat transfer agent having a high flash point and fire point.

The basic and novel feature of the invention is the use of a halogenated diphenyl ether to dissolve the tetrachlorobenzene and the selective solubility of the two isomers in these solvents enabling the fractional crystallization of the 1,2,4,5-tetrachlorobenzene and the retrieval of a valuable by-product. The halogenated diphenyl ether solvent may be any such compound which dissolves the tetrachlorobenzenes and permits the fractional crystallization of the tetrachlorobenzenes. Suitably such diphenyl ethers are the brominated and chlorinated diphenyl ethers or mixtures thereof. Preferred solvents are liquids at room temperature, with the chlorinated diphenyl ethers being especially preferred. Of special interest in the invention is the diphenyl ether reacted with about two moles of chlorine.

Mixtures of the halogenated diphenyl ethers are usually employed in the present invention because the operability of the invention does not depend upon a certain compound or isomer distribution. As a general rule, the diphenyl ether is halogenated in a free halogenation reaction at elevated temperature until a halogenated diphenyl ether of the desired consistency is obtained. Of course in this free halogenation reaction, the isomer distribution may vary widely as different catalysts and reaction conditions are employed. For example, in the chlorination of diphenyl ether with two moles of chlorine in the presence of $AlCl_3$ at 25° C., some monochlorodiphenyl ether and trichlorodiphenyl ether are present in addition to nearly equal portions of the 2,4- 2,4'- and 4,4'-dichlorodiphenyl ether.

The halogenated diphenyl ether may be used in any amount required to dissolve the tetrachlorobenzenes. In addition to the quantity of halogenated diphenyl ether solvent, other standard techniques for dissolving a solute may be employed. For example, the mixture of halogenated diphenyl ether and tetrachlorobenzene may be heated or stirred vigorously to dissolve the tetrachlorobenzene in the solvent. The preferred technique of dissolving the tetrachlorobenzene is heating the mixture to a temperature of 50° to 150° C. to form an essentially saturated solution. A final temperature of the saturated solution of 50° to 100° C. is especially preferred.

After the tetrachlorobenzene has been dissolved in the halogenated diphenyl ether, the 1,2,4,5-tetrachlorobenzene is fractionally crystallized from the mixture. This fractional crystallization is accomplished by any ordinary technique. For example, the solution may be cooled to crystallize the 1,2,4,5-isomer or the halogenated diphenyl ether solvent may be removed to precipitate the 1,2,4,5-tetrachloro isomer. Of these techniques, the cooling of a warm solution is preferred with the cooling of a solution having a temperature of 50° to 150° C. to about ambient temperatures being especially preferred. The crystals formed may be separated by any conventional means such as filtration and the essentially pure 1,2,4,5-tetrachlorobenzene may be processed further.

The mother liquor remaining after crystallization is the halogenated diphenyl ether containing 1,2,3,4-tetrachlorobenzene and minute amounts of 1,2,4,5-tetrachlorobenzene. This mother liquor is useful as a fire resistant heat transfer agent and as a hydraulic fluid. The concentration of the tetrachlorobenzenes in the halogenated diphenyl ether mother liquor may vary widely. Suitably, the halogenated diphenyl ether may contain about 5 to about 80% or more by weight of the tetrachlorobenzene with concentrations of 10 to 50% being preferred for the dichlorodiphenyl ether because these compositions are fluids at ambient temperature.

Thus, by the process of the invention, useful 1,2,4,5-tetrachlorobenzene may be isolated from its mixture with the 1,2,3,4-isomer and the mother liquor may be used as an effective fire resistant heat transfer agent.

SPECIFIC EMBODIMENTS

Example 1

A chlorinated diphenyl ether was prepared by reacting two moles of chlorine with diphenyl ether in the presence of aluminum chloride at 25° C. 50 grams of this dichlorodiphenyl ether mixture and 50 grams of distilled tetrachlorobenzene containing 15% of the 1,2,4,5-tetrachlorobenzene isomer were mixed and warmed to 67° C. to obtain complete solution. The solution was then cooled to 25° C. and the crystalline precipitate filtered to give 90.7 g. of filtrate and 7.5 g. of 1,2,4,5-tetrachlorobenzene having a melting point of 135°–138° C. (lit. M.P. 139°–140° C.). Thus, almost 100% of the original 1,2,4,5-tetrachlorobenzene and the crude tetrachlorobenzene mixture was recovered.

Example 2

Mixtures of dichlorodiphenyl ether and tetrachlorobenzene containing about 85% of the 1,2,3,4-isomer were prepared and tested according to the Cleveland open cup method for flash point and fire point. Various compositions and their characteristics are shown in Table I.

TABLE I.—PROPERTIES OF DICHLORODIPHENYL ETHER-TETRACHLOROBENZENE MIXTURES

| Sample | Weight percent | | Flash point, °F. | Fire point, °F. |
|---|---|---|---|---|
| | $\phi Cl_4$ a | $Cl_2DPO$ b | | |
| 1 | 0 | 100 | 335 | 530 |
| 2 | 10 | 90 | 350 | 580 |
| 3 | 20 | 80 | 355 | 570 |
| 4 | 30 | 70 | 350 | 570 |
| 5 | 40 | 60 | 350 | None |
| 6 | 44 | 56 | None | None |
| 7 | 50 | 50 | 355 | None | a Tetrachlorobenzene.  b Dichlorodiphenyl ether.

In the same manner as described by the example above, other chlorinated diphenyl ethers and brominated diphenyl ethers may be prepared and used to separate 1,2,4,5-tetrachlorobenzene from its crude mixture with 1,2,3,4-tetrachlorobenzene. For example, monochlorodiphenyl ether, monobromodiphenyl ether, dibromodiphenyl ether and the mixtures of these ethers with higher halogenated diphenyl ethers or the higher halogenated diphenyl ethers alone may be employed to dissolve the tetrachlorobenzene, and the 1,2,4,5-isomer may be crystallized from that solution.

Also, as shown in Example 2, mixtures of the halogenated diphenyl ethers and tetrachlorobenzenes obtained as mother liquors in the fractional crystallization may be suitably employed as fire resistant heat transfer agents.

We claim:

1. A method for separating 1,2,4,5-tetrachlorobenzene from its mixture with 1,2,3,4-tetrachlorobenzene comprising dissolving said mixture in a solvent selected from the group consisting of chlorinated and brominated diphenyl ethers at a temperature of 50° to 150° C. to form an essentially saturated solution, fractionally crystallizing the 1,2,4,5-tetrachlorobenzene from solution and separating the 1,2,4,5-tetrachlorobenzene crystals from the resulting mother liquor.

2. The method of claim 1 wherein the solvent is liquid at room temperature.

3. The method of claim 1 wherein the solvent is chlorinated diphenyl ether.

4. The method of claim 1 wherein the solvent is diphenyl ether reacted with about two moles of chlorine.

5. The method of claim 1 wherein the tetrachlorobenzene mixture is dissolved in dichlorodiphenyl ether at a temperature of 50° to 150° C. to form an essentially saturated solution and the solution is cooled to room temperature to crystallize 1,2,4,5-tetrachlorobenzene.

References Cited

UNITED STATES PATENTS

| 2,849,500 | 8/1958 | Hanna | 260—650 |
| 2,938,929 | 5/1960 | Bareis | 260—650 |

HOWARD T. MARS, Primary Examiner

U.S. Cl. X.R.

252—77